United States Patent [19]

Rice

[11] Patent Number: 4,543,781
[45] Date of Patent: Oct. 1, 1985

[54] ANNULAR COMBUSTOR FOR GAS TURBINE

[76] Inventor: Ivan G. Rice, P.O. Box 233, Spring, Tex. 77373

[21] Appl. No.: 486,495

[22] Filed: Apr. 19, 1983

Related U.S. Application Data

[60] Continuation-in-part of Ser. No. 274,660, Jun. 17, 1981, Pat. No. 4,384,452, and Ser. No. 224,496, Jan. 13, 1981, Pat. No. 4,438,625, said Ser. No. 274,660, is a division of Ser. No. 47,571, Jun. 11, 1979, Pat. No. 4,314,442, said Ser. No. 224,496, is a division of Ser. No. 954,832, Oct. 26, 1978, Pat. No. 4,272,953.

[51] Int. Cl.$^4$ .............................................. F02C 3/14
[52] U.S. Cl. .................................... 60/39.36; 60/730; 60/755
[58] Field of Search .................. 60/39.32, 39.36, 730, 60/737, 751, 752, 755, 756, 757

[56] References Cited

U.S. PATENT DOCUMENTS

| | | | |
|---|---|---|---|
| 2,544,538 | 3/1951 | Mahuken et al. | 60/39.32 |
| 2,569,446 | 10/1951 | Bonvillian et al. | 60/39.36 |
| 2,647,368 | 8/1953 | Triebnigg et al. | 60/39.05 |
| 2,743,579 | 5/1956 | Gaubatz | 60/39.36 |
| 2,988,886 | 6/1961 | Hamm et al. | 60/752 |
| 3,631,674 | 1/1972 | Taylor | 60/39.36 |
| 3,722,216 | 3/1973 | Bahr et al. | 60/737 |
| 3,729,930 | 5/1973 | Williams | 416/97 R |
| 3,804,551 | 4/1974 | Moore | 416/97 R |
| 3,849,025 | 11/1974 | Grondahl | 416/97 R |

FOREIGN PATENT DOCUMENTS

| | | | |
|---|---|---|---|
| 767546 | 11/1952 | Fed. Rep. of Germany | 416/97 R |
| 117810 | 9/1979 | Japan | 416/97 R |
| 104506 | 11/1980 | Japan | 415/115 |

Primary Examiner—Louis J. Casaregola
Attorney, Agent, or Firm—Stuart D. Frenkel

[57] ABSTRACT

A combustor for producing a combustion gas stream turns the gas exiting therefrom to direct the gas stream at a first stage nozzle at a more advantageous angle of attack. The combustor is formed of a plurality of sections, each section containing a plurality of U-shaped steam coils placed askew to the linear axis if the combustor, the bend of the tubes forming the dome and the legs forming the respective inner and outer surfaces of the annulus.

21 Claims, 17 Drawing Figures

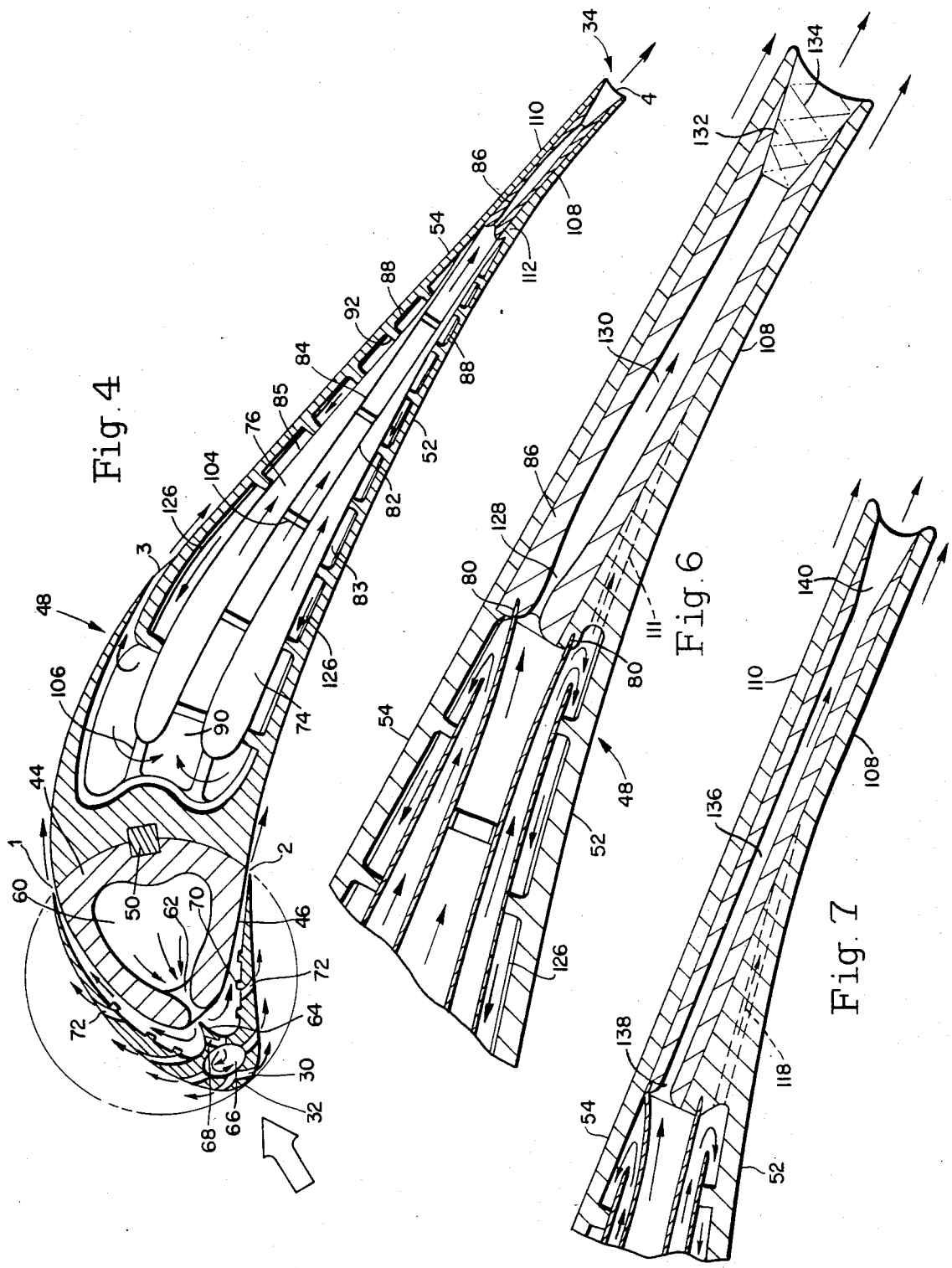

SONIC SHOCK WAVE

72°

36°

STEAM / GAS SONIC SHOCK WAVE

4,543,781

ANNULAR COMBUSTOR FOR GAS TURBINE

CROSS REFERENCE TO RELATED APPLICATIONS

This application is a Continuation-in-part of U.S. application Ser. No. 274,660, filed June 17, 1981, now U.S. Pat. No. 4,384,452 which is a division of U.S. application Ser. No. 47,571, filed June 11, 1979, now U.S. Pat. No. 4,314,442.

This application is also a Continuation-in-part of U.S. application Ser. No. 224,496, filed Jan. 13, 1981, now U.S. Pat. No. 4,438,625 which is a division of U.S. application Ser. No. 954,832, filed Oct. 26, 1978, now U.S. Pat. No. 4,272,953.

FIELD OF THE INVENTION

This invention relates to improvements in the reheat gas turbine and, more specifically, to a reheat gas turbine/steam turbine combined cycle with steam cooling of the first stage nozzle vanes contained in both the gas generator and power turbine. The invention further relates to a process of performing work using a steam cooled reheat gas turbine. This invention is equally applicable to simple cycle gas turbines.

DESCRIPTION OF PRIOR ART

In U.S. Pat. No. 4,272,953, applicant has disclosed that second generation, high-cycle pressure-ratio, high-firing temperature gas generators can be used in the reheat gas turbine/steam turbine combined cycle to yield increased efficiency and output heretofore unexpected from reheat gas combined cycles. A novel reheat gas turbine without intercooling combined with a steam turbine is further disclosed in applicant's pending application, U.S. Ser. No. 224,496, filed Jan. 10, 1981. In this pending application, the reheat gas turbine comprises a juxtaposed and axially aligned gas generator and power turbine in which gas flow through the gas generator, reheat combustor and power turbine is substantially linear throughout.

In U.S. Pat. No. 4,314,442, applicant has disclosed that steam extracted from the steam turbine in a reheat gas turbine/steam turbine combined cycle can be used to cool the reheat gas turbine vanes and rotating blades. Steam cooling is shown to offer advantages over cooling with air or water at the higher temperatures which are possible in the reheat gas turbine/steam turbine combined cycle described in U.S. Pat. No. 4,272,953. As described in U.S. Pat. No. 4,314,442, the extracted steam is directed as an external thermal barrier over the reheat gas turbine vanes and rotating discs and blades from internal steam plenums within the respective vanes and blades. Internal steam convective cooling of the gas turbine rotating blades is also beneficially used. The heated coolant steam is eventually ejected into the gas stream. It has been found that gas generator work is obtained by ejecting the coolant into the gas stream and reheat pressure and reheat temperature are raised as well.

In pending applications, U.S. Ser. Nos. 416,171; 416,172; 416,173 and 416,275; all filed Sept. 9, 1982, applicant has disclosed that the gas generator and power turbine casings, struts, inner barrels, exhaust hood and discs can be cooled by steam to allow a higher reheat firing temperature. These parts are cooled in a computer-controlled manner wherein the tip clearances of the compressor and turbine blades can be reduced and minimized under all operating conditions to improve cycle output and efficiency. A closed steam cooling system is disclosed wherein the coolant steam after being heated is re-introduced to the steam turbine to form a second steam reheat which results in greater steam turbine output at a higher combined cycle efficiency.

As shown by applicant, there are distinct advantages to utilize steam as a gas turbine blade coolant for high-inlet temperature levels of 2600° F. for both the simple and reheat gas trubines operating in the combined cycle mode. For example, steam is twice as effective a coolant as air and is not as harsh or as difficult to control as water. All of applicant's U.S. patents and pending applications as described above are herein incorporated by reference to illustrate the advantages of steam as a blade coolant.

Air has been extensively used as a blade coolant. The emphasis in applying air as a coolant has been to accomplish the most effective cooling possible and thus allow raising the turbine inlet temperature. The air coolant has been given only secondary consideration as a working fluid. However, aircraft engine manufacturers are presently using thermal barrier ceramic coatings for the blading whereby less air is consumed for cooling, leaving more air to do full work.

On the other hand, when considering steam as a coolant, as in applicant's prior patents and pending applications, emphasis can also be placed on the steam being a working fluid. Pressure drop is not as critical since water can be pumped to 3000 psia pressure for only 10 BTU/lb. The old criteria of cooling effectiveness does not hold the same meaning where it is now possible to heat the majority of the steam to the maximum while at the same time provide thermal shielding of the blading through an exterior laminar sublayer of steam which comprises only a small amount of the total steam flow.

An integrated propulsion nozzle is being applied to the "Rolls-Royce RB-211-535 E4" engine for the "Boeing 757" aircraft. Performance gains giving 2% lower specific fuel consumption are realized where both the fan and the hot-core flows exhaust through a single propelling nozzle. High supersonic drag over the afterbody is reduced to a lower subsonic drag. The "RB-211" exit nozzle measures several feet in diameter. However, the same general concept can be applied to very small steam nozzles measuring ten to twenty thousandths of an inch whereby steam with its much lower viscosity, higher specific heat, and higher Mach 1 velocity than air can be substituted in principle for the fan bypass air.

Historically, gas turbine first stage nozzle vanes have been subject to leading edge burning and low cycle fatigue cracking and the trailing edge region has been prone to develop hot spots, cracks and burn areas, particularly on the suction sides. Shower-head weep holes at the leading edge of the nozzle vanes have been added to provide cooling thereof, but the very thin trailing edge portion has been difficult to properly cool due to lack of adequate space and available thickness.

Various methods of air cooling both stationary vanes and rotating blades have been patented and are in use today in aircraft and industrial gas turbines. U.S. Pat. No. 3,628,880 granted Dec. 21, 1971 to Robert J. Smuland et al relates to an air cooled vane utilizing impingement cooling, convection cooling with turbulence promoters and external film cooling. U.S. Pat. No.

3,628,885, granted Dec. 21, 1971 to James E. Sidenstick et al relates to an air cooled rotating blade utilizing a serpentine flow path and turbulence promoters as well as impingement cooling and film cooling. U.S. Pat. No. 4,153,386 granted May 8, 1979 to John A. Leogrande et al relates to vane leading edge air cooling and pressure requirements thereto. These U.S. patents, however, do not apply steam as the coolant nor do they relate to an integrated nozzle configuration whereby the coolant steam is also used efficiently as a working fluid in a binary steam/gas system as in the present invention which is more fully described below.

SUMMARY OF THE INVENTION

In accordance with the present invention, improvements in gas turbine first stage nozzle vane efficiency are achieved by the integration of multiple steam nozzles with the first-stage gas nozzle vanes to form a gas/steam binary flow system. Steam is first used as a vane coolant and subsequently expanded and accelerated for work extraction by the rotating blades as the hot gases pass around the nozzle vanes. A first stage 360° integrated critical flow exit area controls the mass flow and inlet pressures of both the steam and the hot gas. The present invention is applicable to both simple and reheat gas turbines with or without a combined steam turbine.

Additionally, the present invention provides improved fluid cooling of the nozzle vane by altering the airfoil shape to form an integrated gas/steam nozzle vane with improved exterior steam thermal barrier film shielding. By aligning the combustor to serve as a gas turning device to reduce the angle of attack of the gas to the individual vanes, the gas turning requirement of the first stage nozzle can be reduced. The shape of the individual vane is altered by reducing the radius of curvature of the surfaces. Such reduced curvatures enhance steam thermal barrier film shielding since a more stable laminar sublayer portion of the exterior steam boundary layer can be formed.

This invention presents an approach for integrating a steam nozzle with the gas nozzle whereby nozzle vane cooling by internal steam flow is first accomplished. Serpentine reverse-flow cooling of the vane body is provided for internal vane body cooling. A novel concept for internal trailing edge "shock wave cooling" is set forth whereby the coolant steam laminar sub-layer within an internal trailing edge nozzle is destroyed to greatly improve heat transfer in the vital trailing edge region. Alternately, for sonic nozzle steam flow at the trailing edge, steam diffusion separation from sonic to subsonic velocity can likewise be provoked to destroy the sub-layer and enhance trailing edge heat transfer.

Shock wave cooling as in the present invention can be described as follows: Airflow (gas or steam) across a shock wave always decreases from supersonic to subsonic velocity. The strength of the shock wave varies with the amount of the deceleration of flow velocity. A strong shock wave absorbs energy. In a properly designed convergent/divergent nozzle, the flow downstream of the throat is supersonic. An internal steam nozzle located at the vane trailing edge can be designed to act in this fashion. An induced shock wave formed by over-expansion downstream of the throat can be weak or strong depending on the degree of deceleration. As the shock wave grows stronger, the thin sluggish layer of flow (steam or gas) near the surface known as the boundary layer is influenced by the shock wave. The boundary layer attempts to reverse itself aft of the shock and flow upstream towards the shock, causing a phenomenon known as "shock-induced boundary layer separation". A separated boundary layer creates a turbulent wake aft of the shock. This reversal flow destroys the laminar sub-layer insulation next to the surface and exposes the bare metal to the coolant. A much greater heat transfer coefficient results for much greater cooling rates.

In an opposite sense, controlling and limiting the velocity to Mach 1 on the exterior aft suction side of the vane will prevent a shock wave developing and prevent boundary layer separation of the exterior steam thermal barrier. A laminar exterior steam film can be maintained to reduce drag and to provide steam film insulation with lower heat transfer rates. Airflow across a shock wave is clearly explained in U.S. Pat. No. 3,952,971 to Richard T. Whitcomb, granted Apr. 27, 1976 for Airfoil Shape For Flight At Subsonic Speeds. The intent given in this referenced patent is to reduce drag and increase lift and this airfoil is presently being applied to the "Harrier" vertical take-off and landing military aircraft and the "Boeing 757 and 767" commercial passenger aircrafts. The same aerodynamic principles are applied in the present invention to reduce or increase, as the case may be, heat transfer primarily and secondarily to reduce overall drag. Such principles have never been applied or suggested in gas turbine vanes before for improved internal cooling and external reduced heat transfer.

A further objective of this invention is to set forth a method of improving the efficiency of the integrated nozzle through reduced surface friction losses and reduced trailing edge losses by reducing the trailing edge wedge angle from the customary ten degrees to zero. Vector momentum is thus conserved.

A still further objective of this invention is to provide a segmented steam or low BTU fuel gas cooled annular combustor liner whereby the combustor can be assembled and disassembled in individual segments around a continuous shaft and whereby the joints between the individual segments can be locked together to form a complete annular combustor liner without any horizontal joints of flanges which cause thermal stresses and uneven thermal expansion. Heretofore, attempts to provide an annular combustor liner that can be fit around a continuous shaft have not been successful for single shaft industrial gas turbines even though the superior characteristics of even temperature distribution to the first stage nozzle of the annular combustor are well known.

Still another objective of this invention is to provide a combustor liner with approximately 25 percent greater flow length for a given axial length by changing the axial direction of the gas, thus, making the gas flow askew to the axis of the machine and causing the gas to expand radially outwardly as the gas is heated by the burning fuel. Cooling air passes around and through the combustor liner to mix with the near stoichiometric primary flame to temper the mixture to an even sculptured temperature profile to the first stage nozzle. The individual high temperature spikes of the individual cylinder combustors of the "can" type combustor are eliminated, such spikes causing undesirable pulsating forces on the downstream rotating blades and possible failures thereof. The temperatures of the gas near the nozzle inner and outer sidewalls can be reduced to a lower temperature by some 300° F. with the maximum temperature being located approximately two-thirds outwardly from the inner root of the vanes and rotating blades. Such profiling with annular combustors is well known by those familiar with the art of gas turbines.

The mentioned objectives of the present invention and other objectives will become apparent upon a more detailed description of the integrated gas/steam nozzle and the integrated combustor/first stage nozzle and can be ascertained by the detailed description of the drawings.

BRIEF DESCRIPTION OF THE DRAWINGS

FIG. 4 is an enlarged cross-sectional view of the vane assembly taken along line 4—4 of FIG. 3.

FIG. 6 is an enlarged partial cross-sectional view of the vane body showing a trailing edge convergent/divergent coolant steam nozzle.

FIG. 7 is an enlarged partial cross-sectional view of the vane body showing an alternate configuration of a trailing edge convergent coolant steam nozzle.

DETAILED DESCRIPTION OF THE INVENTION

Like reference numbers will be used to identify like parts in the following description of the preferred embodiments.

Figure 1:
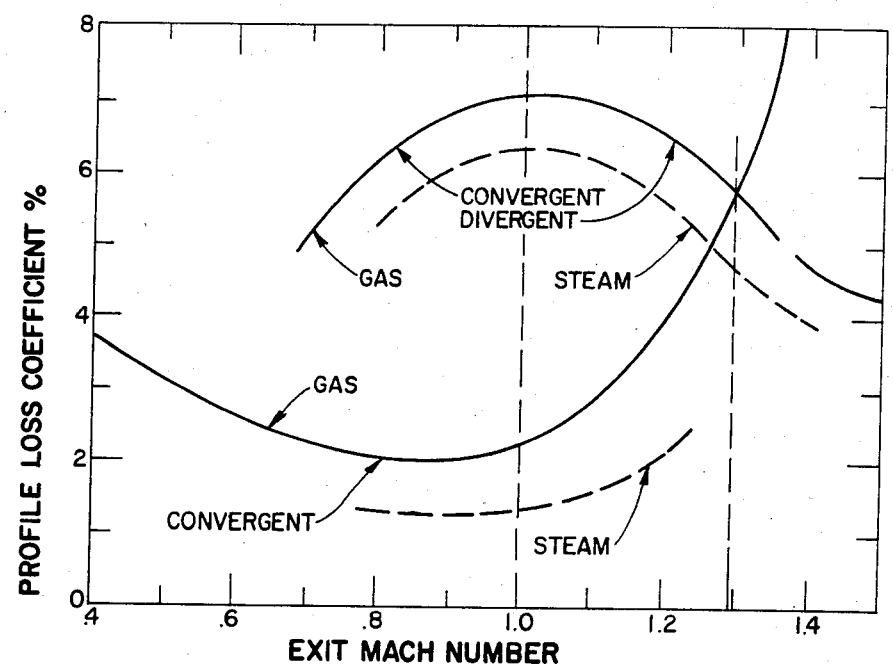
FIG. 1 is a graph of profile loss coefficient versus exit Mach number for typical convergent/divergent and convergent gas turbine nozzles with normal gas losses shown by the solid lines and losses associated with the integrated gas/steam nozzle of the present invention shown by the dashed lines.

A typical profile loss ccefficient graph for both convergent and convergent/divergent gas turbine nozzles is presented in FIG. 1 where profile loss coefficient is plotted against exit Mach number. The profile loss coefficient for any given Mach number reflects the loss in total pressure taking place and specifically the loss in potential exit velocity. Such loss is reflected in less mechanical work extraction by the rotating blades. This graph shows clearly that the profile loss for a Mach 1 (convergent) nozzle is low, being about 2 percent, whereas a convergent/divergent design has much higher losses, ranging from 5 to 7 percent. Superimposed on the graph of FIG. 1 are dashed lines showing loss savings achieved using the integrated gas/steam nozzle of this invention as more fully described below. Surface frictional loss is lowered due to blanketing steam having one-half the viscosity of the gas. Also, the trailing edge exit loss can be reduced by eliminating the customary ten degree wedge angle. The wedge angle is the angle formed at the trailing edge by the trailing edge suction side surface and the trailing edge pressure side surface, the lines forming the wedge angle being tangent to the curvature at the trailing edge extremities. Mach 1.1 to 1.2 efficiency savings are of particular interest.

Figure 2:
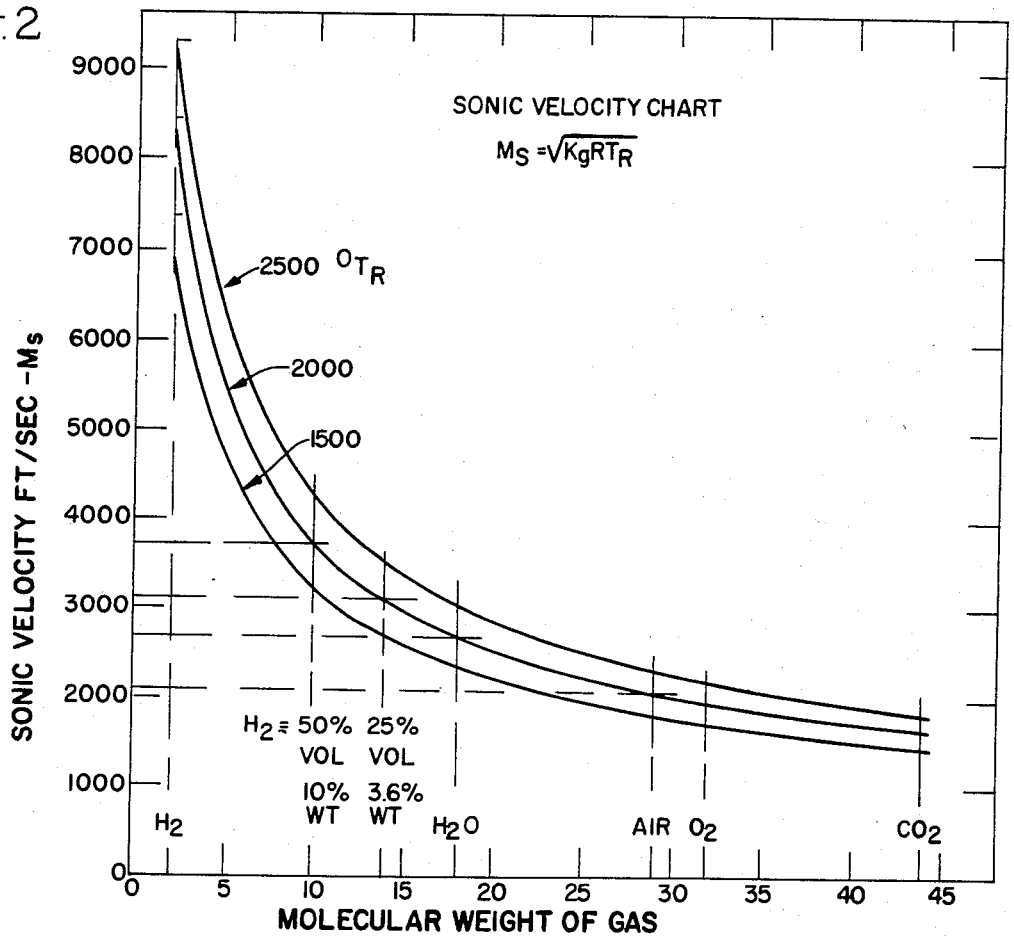
FIG. 2 is a graph of sonic velocity versus molecular weight of several gases at various temperatures.

When considering steam as a blanketing fluid for film cooling (shielding) and as a working fluid, surface sonic velocity becomes important. Steam has a notably higher sonic velocity than air (gas stream) for any given temperature. For instance, at 800° F. the Mach 1 velocity is 23.0 percent higher for steam and at 2600° F. this velocity is 21.9 percent higher. A graph of sonic velocity versus gas molecular weight is given in FIG. 2. Note that air at 2000°0 R. (1540° F.) has a sonic velocity of about 2100 ft/sec whereas steam at this temperature has a Mach 1 velocity of 2700 ft/sec. Also note that hydrogen has a very high sonic velocity of some 8400 ft/sec. for this temperature. A mixture of 96.4 percent steam and 3.6 percent hydrogen by weight would have a sonic velocity of about 3100 ft/sec. Likewise a mixture of steam and air (50 percent by volume, 38 percent by weight) would have a sonic velocity of about 2400 ft/sec.

Hydrogen is known for its excellent cooling characteristics. Thus, in accordance with the present invention, steam as a coolant can be "sweetened" with hydrogen for the reheat first-stage nozzle if such addition results in a mixture that is well below the flammability limits of 4% by volume in air. Most of the hydrogen added can be oxidized in the reheat combustor, at least the portion that enters the primary heat release zone. Although, "spiking" steam with hydrogen offers interesting possibilities, hydrogen is most difficult to handle and store. Likewise, "spiking" cooling air with steam has distinct advantages and will improve the cooling capabilities of pure air in accordance with the mixture's sonic velocity.

There is another important consideration when applying steam blanketing for nozzle vane cooling and as a working fluid and that consideration is cooling effectiveness decay due to the mixing and diffusion of the steam and gas downstream of the steam nozzles which are contained in the leading edge of the integrated nozzle vanes of this invention. The rapid temperature rise of the majority of the coolant steam increases the work capability but decreases the steam cooling ability by also increasing the film temperature. Both aspects must be considered. This decay in cooling effectiveness points to the need for additional downstream internal vane cooling and also indicates that such cooling should be in a reverse direction from the vane trailing edge upstream to the leading edge steam nozzles. It is important to maintain blade metal temperatures as even as possible to avoid adverse thermal gradients and uneven expansion which is a cause for low cycle fatigue problems.

Gas turbine nozzles provide four basic functions which are vital and necessary to convert thermal energy to mechanical work. These functions are listed as follows:

1. Accelerate the gas,
2. Change and control gas direction,
3. Control gas-mass flow,
4. Reduce gas temperature to rotating blades.

The gas must be accelerated efficiently to a given design velocity through a pressure drop process. The first stage nozzle is unlike downstream rotating blading or subsequent nozzles because its approach velocity is rather low—being about Mach 0.1. Greater acceleration is required. Work after acceleration can then be extracted from the gas by applying impulse or a combination of impulse and reaction rotating blading. Secondly, the gas must strike the rotating blades at the right angle for maximum work output and extraction efficiency. The gas turning angle of the first stage nozzle is generally about 70 to 72 degrees with respect to the centerline of the turbine. Thirdly, the mass flow must be controlled. This third function is generally accomplished by designing a critical area first stage nozzle where sonic (choking) velocity prevents any further increase in mass flow for any given inlet pressure regardless of the outlet pressure. The fourth function is achieved by a significant temperature drop of the gas when pressure drops and the gas accelerates.

Blade cooling using air as the coolant introduces a parasitic loss and the cooling air has no basic function of providing additional work. Extra work comes from the increase in firing temperature.

When considering an integrated binary gas/steam nozzle, there are four additional functions besides the four basic functions previously listed that must be considered when the steam is used not only as a coolant, but also as a working fluid. The additional four functions are as follows:

5. Reduce friction loss,
6. Mix cool steam with hot gas,
7. Provide film cooling (shielding),
8. Increase exit velocity past Mach 1 without extra loss.

Item 5 deals with surface friction. Steam at a lower temperature and lower basic viscosity has half the viscosity of cooling air and, therefore, if steam is introduced efficiently and effectively near the vane leading edge, then less overall frictional loss will occur across the downstream surfaces.

The majority of the steam injected into the gas stream from the steam nozzles in the vane, Item 6, must be heated by the hot gas as early as possible to obtain maximum steam work. The heating is accomplished through diffusion and mixing in the outer regions of the boundary layer.

The nozzle vane must also provide the function of establishing a stable laminar flow sub-layer over most of the outer surface whereby an insulative shield is formed to reduce heat transfer, Item 7.

The difference in Mach 1 velocities, Item 8, of steam versus air (gas) gives rise to the distinct possibility of being able to accelerate the main-stream gas to a Mach value of perhaps 1.15 without suffering the usual high trailing edge shock wave loss.

NOZZLE VANE CONFIGURATIONS

Figure 3:
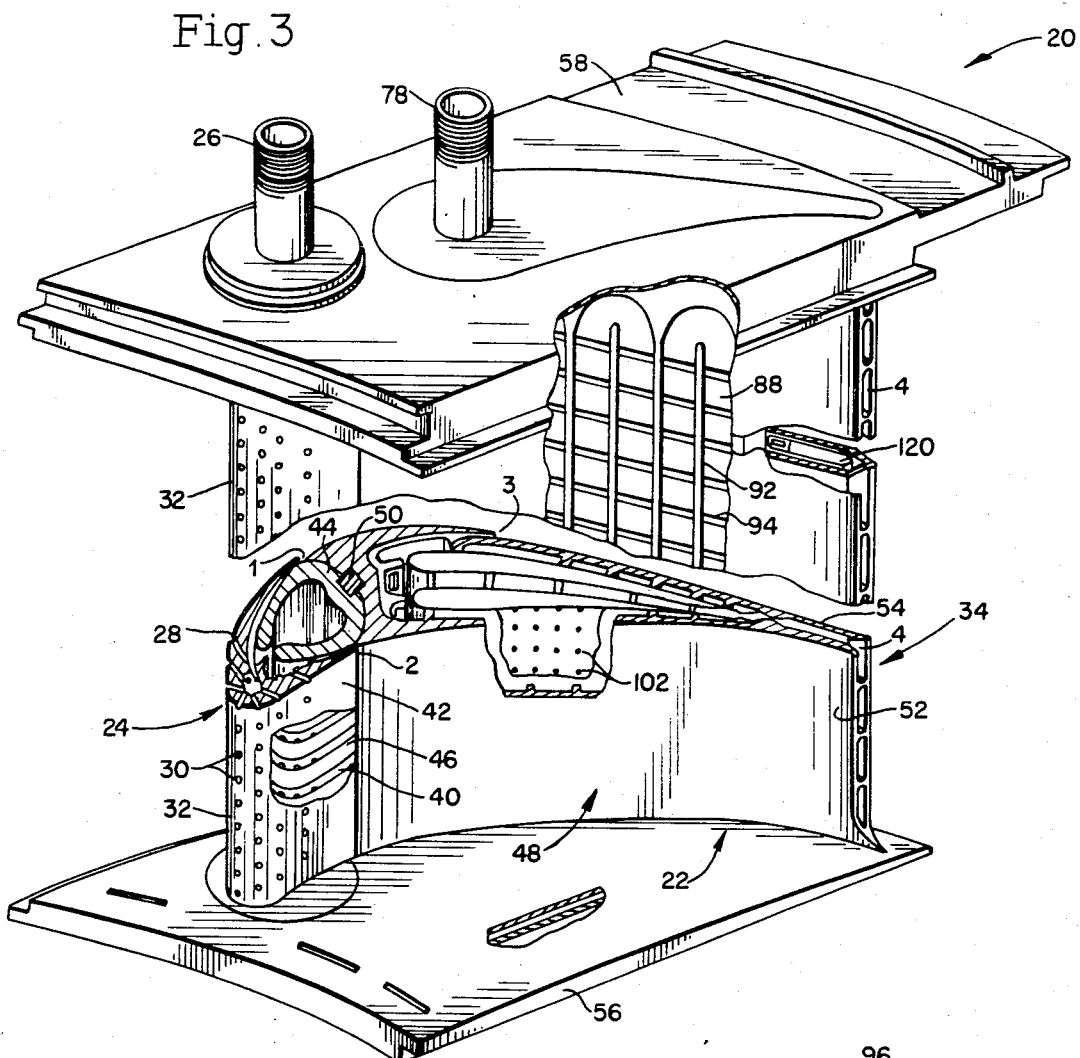
FIG. 3 is a perspective view in partial section of the vane assembly of this invention.

Typically, there are 24 to 48 vanes in the 360° entrance nozzle for a 300 lb/sec. airflow turbine. FIG. 3 shows a typical nozzle segment 20 containing one vane 22. With reference to FIGS. 3 and 4, nozzle vane 22 is a "fat-bodied" type nozzle vane airfoil. Nozzle vane 22 comprises a removable, leading edge portion 24 connected to a source of steam which is fed through plenum 26. Leading edge portion 24 has a ceramic thermal barrier outer coating 28 and contains "shower-head" weep holes 30 at nose 32. Weep holes 30 curve back toward trailing edge portion 34 of vane 22. Two leading edge steam nozzles 1 and 2 are contained in leading edge portion 24. Vertically spaced fins 40 of approximately 0.010 of an inch thick connect forward shell 42 with plenum core 44 and form nozzle channels 46. Fins 40 provide flexibility for differential expansion between plenum core 44 and forward shell 42 and also provide extended heat transfer surface. Leading edge portion 24 can be either cast or made up of thin wafers fusion-bonded together, a new technique currently being developed. Leading edge portion 24 is positioned on vane body 48 by keyway 50. Vane body 48 formed by vane walls 52 and 54 is cast as part of inner and outer side walls 56 and 58, respectively, FIG. 3. It should be noted that side walls 56 and 58 can be shaped to provide proper side wall acceleration and gas stream flow. There can be one or two vanes 22 per vane segment 20.

The cooling of leading edge portion 24 with steam can be understood by referring to FIG. 4. Coolant steam entering plenum 26 is directed to leading edge steam plenum 60. From plenum 60, the coolant steam passes through nozzle 62, is split by leading edge flow divider 64 and directed to nozzle channels 46 of respective leading edge steam nozzles 1 and 2. A small portion of the steam passing through nozzle 62 enters a swirl chamber 66 through tangential flow holes 68. Swirl chamber 66 is contained in nose 32. Steam then weeps from swirl chamber 66 to the extreme leading edge and exits leading edge 24 through weep holes 30 in nose 32. The majority of the coolant steam is directed to nozzle channels 46 which contain turbulator ribs 70. A small portion of steam from nozzle channels 46 is weeped to the gas stream through weep holes 72 as shown in FIG. 4.

Figure 5:
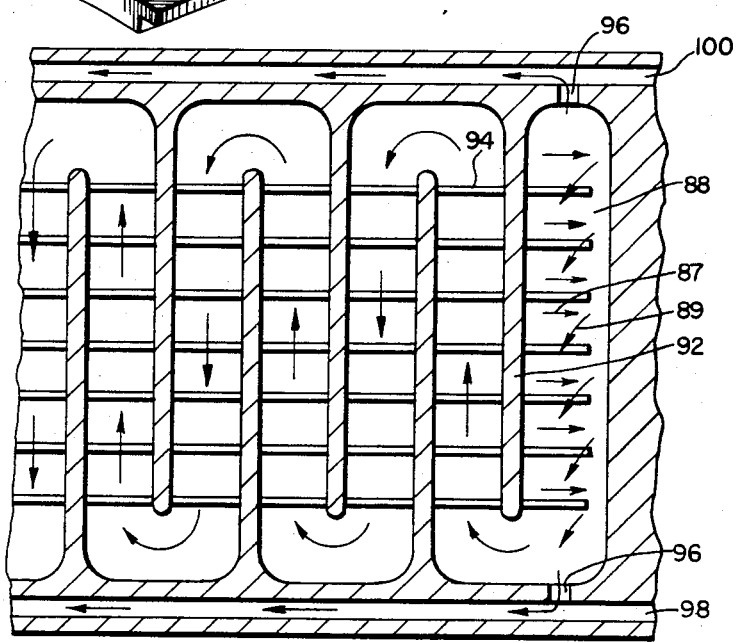
FIG. 5 is an enlarged partial cross-sectional view of the vane body showing impingement and body serpentine coolant steam flow paths.

FIGS. 4 and 5 also illustrate the manner in which vane body 48 is cooled with steam. A separate external supply of steam enters dual "pant-leg" ducts 74 and 76 from entrance plenum 78 at one common connection at outer sidewall 58 for cooling vane body 48. Ducts 74 and 76 are sealed at the inner end and are free to float to allow for differential thermal expansion. One edge 80 of inner duct walls 82 and 84 of respective ducts 74 and 76 runs in a groove in trailing edge nozzle block 86 as shown in FIG. 6 and is not welded or bonded to body 48. Coolant steam entering steam plenum 78, FIG. 3 and discharged to the forward portion of ducts 74 and 76 first travels towards trailing edge 34 where the steam is accelerated to impinge against the interior of vane walls 52 and 54 near trailing edge nozzle block 86. The impingement shown by arrows 87 and 89 in FIG. 5 provides greatly increased heat transfer in a critical area. The coolant steam then takes a serpentine route back and forth between inner and outer side walls 56 and 58, respectively, through wall ducts 88 adjacent to each of vane walls 52 and 54 and back-flows to steam nozzle 3 and central steam plenum 90. Serpentine flow is common practice for air cooling. The vertical dams 92 and serpentine flow passages 88 are better seen in FIG. 5. The serpentine ducts 88 have thin crossribs (cleats) 94 to promote turbulence. A 30 to 40 psi pressure drop is estimated to take place between ducts 74, 76 and plenum 90. Steam passages 96 near trailing edge 34 allow coolant steam from flow passages 88 to flow through cooling channels 98 and 100 in inner and outer side walls 56 and 58, respectively. Steam from central steam plenum 90 flows again parallel to gas flow to trailing edge steam nozzle 4.

The "pant-leg" ducts 74 and 76 are made of thin sheets of stainless steel material approximately 0.010 of an inch thick which form inner and outer duct walls 82, 83, and 84, 85 of the respective ducts. Alternately, the duct walls can be laminated from two layers of 0.006 of an inch thick material with the inner laminate being fabricated with dimples 102 (see FIG. 3) or upsets 0.003 of an inch deep on a ¼ inch grid. Dimples 102 separate the laminates. The dead space between laminates will provide insulation and reduce heat transfer between steam passing through ducts 74, 76 and steam traversing the serpentine flow. The added pressure inside each duct 74 and 76 forces respective outer wall ducts 83, 85 against the larger vertical dams 92 to form a reasonable seal with low leakage. There are hollowed out bridges 104 between ducts 74 and 76 to prevent ballooning due to the differential pressure. The reaction forces are taken against hollow-end supports 106.

The vane suction side vane wall 54 from steam nozzle 3 all the way to trailing edge 34 is perfectly flat to encourage a stable exterior laminar sub-layer of steam from nozzle 3. The main steam velocity is at Mach 1 where steam exits nozzle 3. The pressure side vane wall 52 of vane 22 between leading edge steam nozzle 2 and trailing edge steam nozzle 4 has only a very slight curvature to help maintain the laminar sub-layer steam film. The main stream is being continuously accelerated and therefore the boundary layer remains stable. The trailing edge pressure surface 108 takes a greater curvature at nozzle 4 so that pressure surface 108 becomes parallel with trailing edge suction side surface 110 thus eliminating the normal wedge or convergent angle. Steam from nozzle 4 fills the downstream void as will be subsequently discussed.

Leading edge steam nozzles 1 and 2 are subsonic. Nozzle 3 is sonic and nozzle 4 can be sonic or transonic as will also be explained. The thickening of the trailing edge at 112 allows space for the "pant-leg" insert and the backflow serpentine arrangement as well as provides for parallel flow.

Reference is made to FIG. 6 which illustrates the trailing edge convergent/divergent transonic cooling steam nozzle 4. FIG. 7 shows the Mach 1 alternate design. The rather thick trailing edge 34 (0.090 to 0.150 of an inch for a typical machine having a 300 lb/sec air flow) made possible by steam nozzle 4 gives rise to a different manufacturing approach not possible with the conventional thin-edge design incorporating low-flow weep holes or low velocity gill escape slots. The thicker trailing edge allows the nozzle vane walls 52 and 54 and sidewalls 56 and 58 to be cast integrally in either single or dual vane segments. Trailing edge walls 108 and 110 can be cast thick enough to insure integrity. It is well known that it is difficult to cast thin sections of 0.020 of an inch or thereabout with integrity even though "HIPPING" might help. Alternately, trailing edge 34 can be cast solid. Subsequently, a slot can be precisely machined into the trailing edge to provide an accurate fit for trailing edge nozzle block 86.

Trailing edge nozzle 4 has rather small and intricately shaped passages which require precision machining and fabrication. The nozzle block 86, for example, can be made in two halves, precisely machined and then fusion-bonded together. Nozzle block 86 can then be finish-machined and inserted into the trailing edge slot. Vane body 48 and nozzle block 86 can be fusion-bonded together to form one piece. Various materials can be selected to form nozzle block 86 and vane body 48. Nozzle block 86 can be made out of a material suitable for maximum erosion resistance and body 48 can be cast out of a material having good low-cycle fatigue, corrosion, high-temperature resistance and castability properties.

Figure 8:
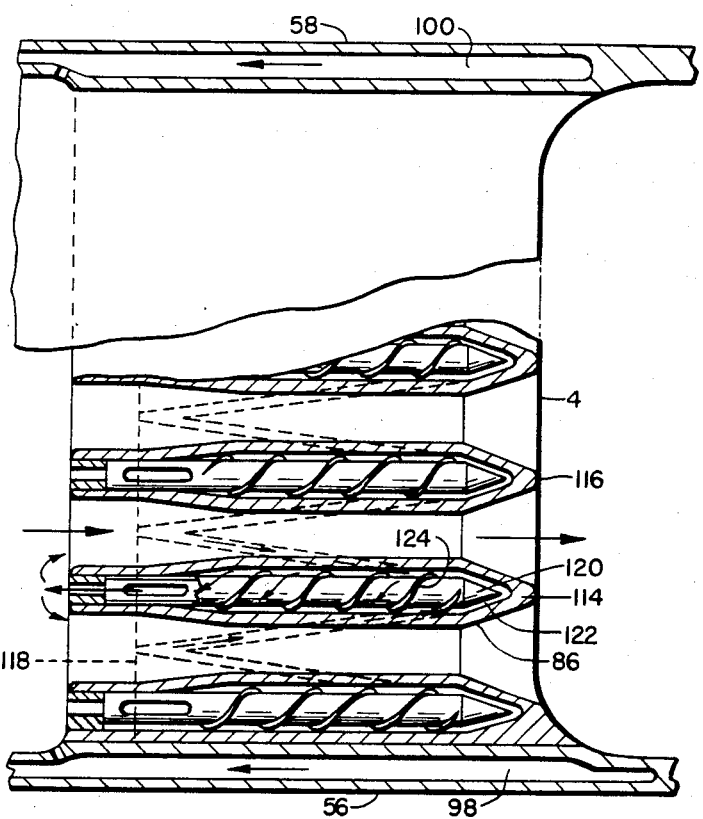
FIG. 8 is an enlarged partial cross-sectional view of the vane body showing the trailing edge steam nozzle and trailing edge coolant passages between nozzles.

Referring to FIGS. 6, 7 and 8, a small portion of steam from duct 74 (pressure side) is fed to the space 114 between trailing edge nozzles 4 which are vertically spaced within trailing edge 34. The steam impinges on the extreme trailing edge 116 of vane 22 for cooling before backflowing to the nozzle 4 entrance. Passageways 118 from duct 74 provide the coolant steam flow. Inserts 120 are placed in drilled holes 122 in nozzle block 86 to force the steam to flow at a high velocity near the sidewall surfaces. The inserts can have broad screw threads 124 to give further steam path travel.

Vane Internal Cladding

It is important that the vane body metal temperature be as uniform as possible to prevent adverse thermal gradients. In addition to the trailing edge cooling and the serpentine backflow arrangement, a further approach is proposed to help even out the temperature from the trailing edge to the mid section.

A thin cladding 126 (about 0.030 of an inch thick) of a material having a very high heat conductivity may be fused to the internal surfaces of vane walls 52 and 54. Copper or silver can be used. Silver has a melting point of 1760° F. and a conductivity of 241 BTU/h/ft$^2$/°F./ft and copper has a melting point of 1980° F. and a conductivity of 227 BTU/h/ft$^2$/°F./ft whereas superalloys have conductivities ranging from 8 to 14 BTU/h/ft$^2$/°F./ft. Copper or silver would be twenty times better as a heat conductor. Aluminum, although a good heat conductor, has too low a melting point to be considered (1220° F.). Copper would probably be the best choice because of its higher melting point.

Techniques of fusing copper to high temperature superalloys have been developed by the Department of Energy through the water-cooled blade research program and can be applied to the steam cooled vane.

The high conductivity metal cladding 126 will conduct heat from the thin trailing edge walls to the thicker body portion so that the vane portion near the alignment keyway 50 will be at an estimated temperature of about 1100° F. whereas the trailing edge metal will be at an estimated temperature of about 1300° F.

Steam/Gas Nozzle Integration

The integration of the multiple steam nozzles with the gas nozzle will now be discussed. The steam must cool the vanes but at the same time exit to the gas stream at a velocity close to the gas-stream velocity and parallel with the flow so that the boundary layer will not be disrupted. The conventional weep holes at their 30 degrees angle in air cooled blades will allow the coolant to blow directly through the boundary layer if the velocity is too great and cause greater heat transfer instead of less. The steam flow exiting tangential to the vane surface avoids this difficulty for off-design operation. Mach numbers must be considered as well as the various heat-transfer aspects involved.

An example of the operation of the integrated nozzle of the present invention can be described for a reheat gas turbine having a 40 cycle pressure ratio and a nominal turbine inlet temperature of 2600° F. Gas at 2600° F. and 564.1 psia allowing a 4% combustor pressure drop expands to the critical Mach 1 exit pressure of 298 psia and 2190° F. at near constant entropy.

Figure 9:
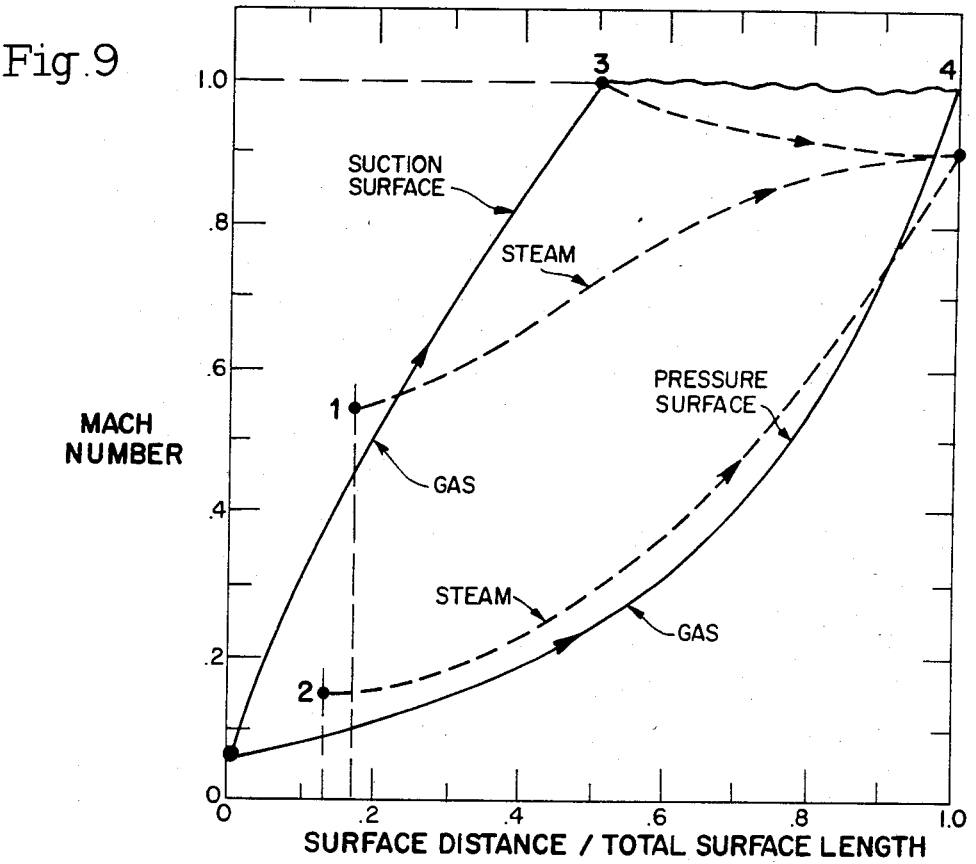
FIG. 9 is a graph of surface Mach number versus surface distance downstream from the vane leading edge.

Reference is now made to FIG. 9 which has been derived for the reheat gas turbine operating at the above-stated conditions. The solid lines represent the gas and the dashed lines represent the steam after it exits from nozzles 1, 2, 3, and 4. It should be noted that even though the gas stream and steam velocities are the same, the Mach numbers are different because steam has a higher Mach velocity and the difference in temperature. The suction-side Mach velocity rises rapidly to nozzle 3 about 50% of distance of the surface where Mach 1 choking takes place. The gas continues at Mach 1 to nozzle 4. The pressure side surface gas Mach number remains rather low for fifty percent of the path and then turns upward to nozzle 4, Mach 1. The greatest increase is near the end. Suction-side steam enters from nozzle number 1, at its Mach number of about 0.55 and progresses subsonically to point 4 where its Mach number is about 0.9. Likewise, pressure-side steam enters from nozzle 2 at its Mach 0.15 velocity and flows subsonically to nozzle 4, Mach 0.9. The steam passing through nozzle passages 46 takes a non-recoverable pressure drop of perhaps 15 psi and expands subsonically through passages 46 to exit points 1 and 2 of FIG. 9.

Suction side steam nozzle 1 steam flow explanation follows for the previously stated operating conditions. The steam at a predetermined pressure of 625 psia and 645° F. expands and exits to the gas stream at a velocity of 1000 ft/sec. at nozzle 1, FIG. 9. The steam then starts to heat as it expands to the trailing edge nozzle 4, taking a somewhat "S" curve due to the heat being progressively added. The final trailing edge exit velocity can be slightly higher than the main gas stream due to the steam's higher enthalpy (driving force), velocity being a function of the square root of the enthalpy drop.

The pressure side steam exiting nozzle 2, FIG. 9 is at a lower exit velocity. Its velocity is about 300 ft/sec. Flow ribs restrict the flow by reducing the pressure before the exit. An exit velocity of about 300 ft/sec. corresponds to the Mach number shown in FIG. 9. Note that the leading edge steam remains subsonic all the way over the vane body surface and approaches Mach 0.9 at the trailing edge. If the steam exited at 1800° F., the Mach 1 velocity would be about 2750 ft/sec Steam pressure in leading edge steam plenum 60 is not critical and can vary somewhat. The designer has freedom in selecting the design pressure and temperature to fit the cold reheat pressure or an extraction point on the steam turbine. Further, if desuperheated steam (saturated) is used, the steam will become supersaturated as it expands through the first nozzle 62 to divider 64. The specific heat can rise to a value greater than one and heat transfer will be improved.

In the example of the 40 cycle pressure ratio reheat gas turbine, steam at a pressure range of 580 to 780 psia, saturated (481° to 515° F.) or with 10° to 20° F. superheat, flows from dual plenums 74 and 76, FIG. 4, to central steam plenum 90. The steam impinges on the area near steam nozzle 4 entrance and makes a 180 degree reversal. It then backflows through serpentine passages to plenum 90 as described previously. The steam, having lost approximately 30 psi pressure and having been heated in the process to a temperature of 800° to 1000° F. is then ready to expand through nozzles 3 and 4, FIG. 4. Approximately 50 percent of the steam accelerates to Mach 1 at each nozzle throat. The steam, in the case of nozzle 3, discharges to the main stream at Mach 1 velocity. The throat exit velocity is about 2000 ft/sec. The steam immediately starts to heat and expand at Mach 1 velocity, approximately 2350 ft/sec.

Nozzle 4 steam has two alternate flow possibilities, see FIGS. 6 and 7. First (FIG. 6), the steam nozzle can be designed to diverge from throat 128 to allow supersonic flow and over-expansion. The nozzle duct 130 after diverging has a constant cross-sectional area being altered only slightly to accomodate boundary layer thickness growth, heating friction and trailing edge heat absorption. The steam is heated as it flows. The nozzle again diverges at 132 near the exit, but the over-expansion cannot accomodate any further divergence and a shock wave is provoked. The shock wave is depicted at 134. The shock wave and downstream reflections thereof destroy the boundary layer at the extreme trailing edge and the laminar sub-layer thermal barrier steam film formed in duct 130 to expose the metal surface at the extreme trailing edge directly to the steam. The surface heat of friction is mixed with the main stream. Heat transfer is thus enhanced.

Figure 10:
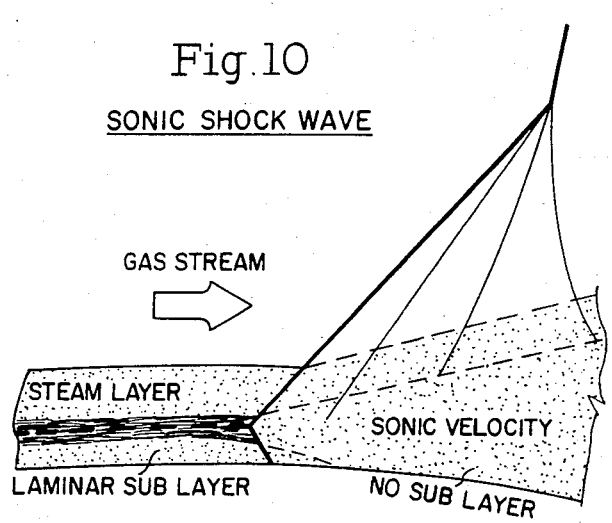
FIG. 10 is a profile of a sonic shock wave showing the destruction of the coolant steam sub-layer.

Reference is made to FIG. 10. Shock waves are created by a disturbance close to the surface next to the laminar (viscous) sub-layer. A severe non-viscous shearing, tearing or ripping takes place that generates a strong sonic output. There is a "bursting" effect. The sound waves cannot escape and they build to form a pressure barrier or shock wave as is well known. It is the action of the flow over the surface or the surface through the gas or steam that creates the shock wave and not the main body of the flow or gas region.

The second alternative (FIG. 7) is for trailing edge steam nozzle 4 to be designed so that the steam will expand to sonic velocity and continue at sonic velocity as it is heated. The steam duct 136 cross-sectional area downstream from throat 138 is increased only in the amount necessary to accomodate the change in density and temperature. The area change can be calculated by the following formula derived from the sonic velocity formula $V_s = \sqrt{KgRT}$ and Boyles law $PV = WRT$.

$$\frac{A_1}{A_2} = \frac{T_2 \sqrt{T_1}}{T_1 \sqrt{T_2}} \tag{1}$$

where $A_1$ is the original throat area, $A_2$ is the downstream area, $T_2$ is the higher (heated condition) temperature and $T_1$ is the upstream temperature. As an example, if the steam is heated from 700° F. to 800° F., the area ratio change would only be 1.042. This area would be increased slightly to accomodate the thickening of the boundary layer. If the duct near the exit point is allowed to diverge rapidly at 140, FIG. 7, the steam will try to diffuse. Separation will set in causing eddy current and reverse flow in the boundary layer. The boundary layer will be destroyed at and downstream of location 140 and the heat of friction will be mixed with the main stream. Heat transfer will increase.

A velocity loss takes place in either nozzle 4 configuration due to the shock wave or Mach 1 to subsonic velocity diffusion separation, but the small loss is considered acceptable in exchange for the improved heat transfer at the trailing edge where it is badly needed.

The gas stream passing trailing edge walls 108 and 110 run parallel with each other as shown in FIGS. 6 and 7. Normally there is a ten degree wedge angle which causes a finite vector momentum loss. Velocity is a vector quantity and the right angle components cancel each other. The momentum can be expressed as follows:

$$M(V_e - V_o) = \tfrac{1}{2} M V_e (1 - \cos \theta/2) \quad (2)$$

where M is the mass, $V_e$ is the velocity of each side (assumed equal) before merging, $V_o$ is the combined velocity after merging and $\theta$ is the wedge angle. Note that only half of the velocity is effected by the wedge angle because the flow momentum is neutral at the center line position between vanes where there is no wedge angle.

The velocity loss (constant mass flow) for a ten degree angle calculates to be about 0.2 percent. This value is small but worth saving when considering that change in enthalpy (and work) varies as the square of the velocity and the 0.2 percent loss for velocity becomes a 0.4 percent loss for work.

The proposed trailing edge has a thickness of about 0.120 to 0.150 of an inch for FIG. 6 and 0.090 to 0.120 of an inch for FIG. 7 considering a typical 300 lb/sec air flow. The steam exiting out of nozzle 4 will be at a temperature of about 900° F. for an entrance temperature of 720° F. A temperature rise due to trailing edge heat transfer is calculated to be about 100°0 F. The exit steam at 900° F. will mix with the 2200° F. gas stream. The steam will heat rapidly and double its volume (Boyle's law) to fill the partial void created by the lips of the nozzle and vertical spaces between each nozzle slot. The surface steam from nozzles 1, 2 and 3 will also heat to fill the partial void. Steam is much superior than air in filling the void because steam expands 1.6 times greater than air for a given temperature rise.

The steam nozzle area and slot width for nozzles 1–4 can be readily calculated from mass flow rates knowing the steam nozzle exit temperature and specific volume.

Gas Turning Angle

Nozzle vanes must turn the gas rather sharply to direct the gas properly to the rotating blades. The turning angle is generally 70 to 72 degrees. Curved vane surfaces are required and such curved surfaces enhance heat transfer from the gas stream to the vane. Recent innovations have been made whereby "blunt-nosed" wedge-shaped designs are being applied whereby the pressure and suction surfaces are much flatter. The surfaces are thus easier to film cool. Some aerodynamic loss occurs at the leading edge when applying this approach, but a low approach velocity minimizes these losses.

Figure 11:
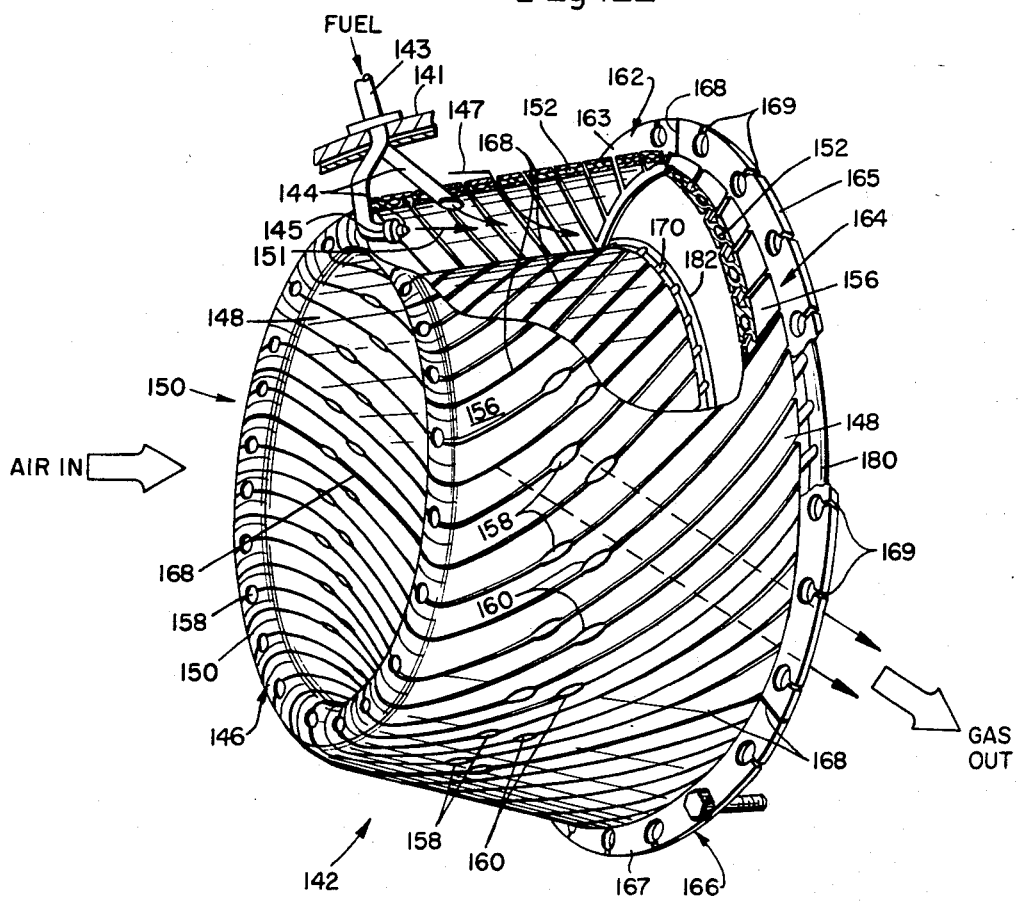
Figure 12:
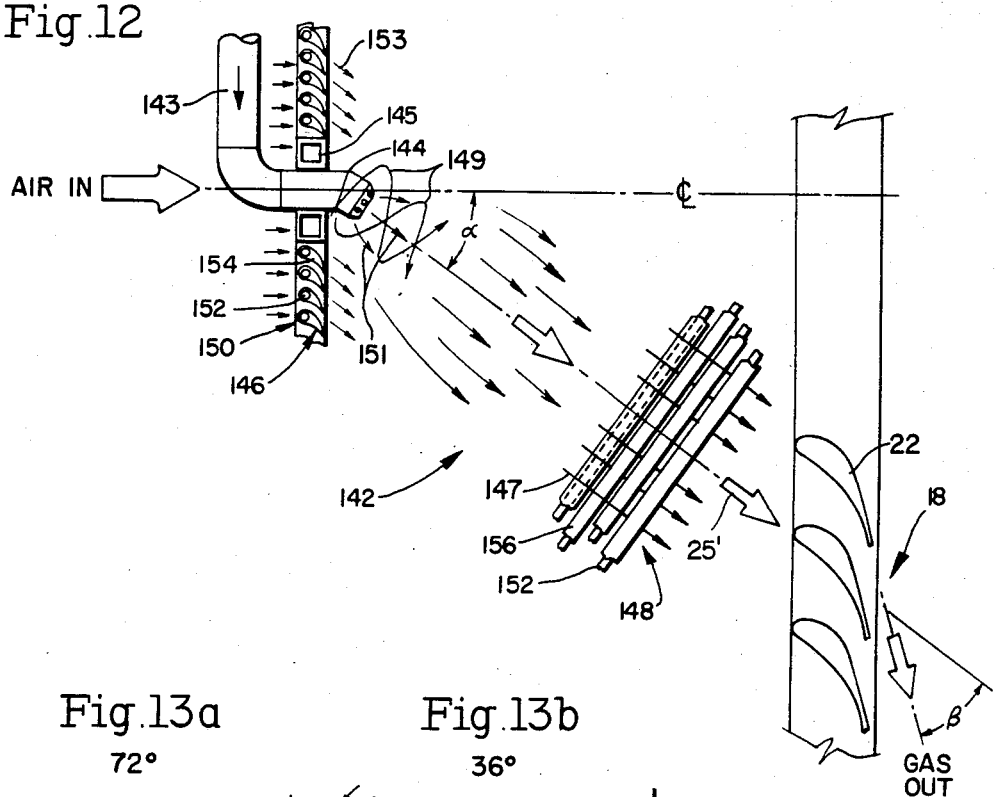
FIG. 12 is a partial vertical cross section of FIG. 11 illustrating air and gas flow to and through in the combustor liner of FIG. 11.

In the case of the steam cooled nozzle vane or any air or water cooled design, another method can be used. Reference is made to FIGS. 11 and 12 which show a steam cooled annular combustor liner at 142. Combustor liner 142 can be tilted outwardly with a smaller entrance pitch line diameter than the outlet pitch line diameter. Compressed air with a general axial flow direction surrounds combustor liner 142 and the pressure is retained by outer casing 141. Fuel is fed to the inside of liner 142 by fuel line 143. Compressed air enters combustor liner 142 between adjacent liner coils 148 as indicated by arrows 147, FIGS. 11 and 12. A set of cocked fuel nozzles 144, dome-turning vanes 146 and steam combustor liner coils 148 which are askew can be applied to effect part of the gas turning function. FIGS. 11 and 12 show one of multiple fuel nozzles 144, combustor dome 150 with turning vanes 146 and liner coils 148 arranged to provide 36 degrees gas turning which is half of the required gas turning angle of 72 degrees. The gas turning angle $\alpha$ plus the vane turning angle $\beta$ thus generally will be equal. The turning vanes 146 in dome 150 comprise cooling coil tubing 152 covered with extended surface streamline sheathing 154. Combustor liner coils 148 comprise cooling coil tubing 152 covered with an extended surface sheathing 156. Steam can be passed through tubing 152 to provide combustor liner cooling. The heated steam can be diverted to a steam turbine, if desired.

Figure 13A:
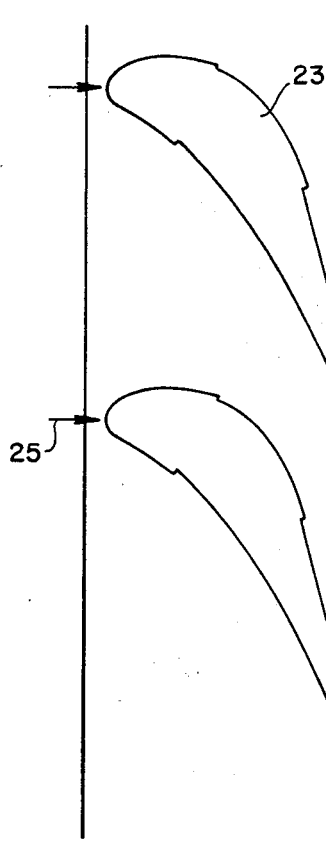
FIGS. 13a and 13b illustrate the cross-sectional shape comparison of alternate vanes with different angles of attack.
Figure 13B:
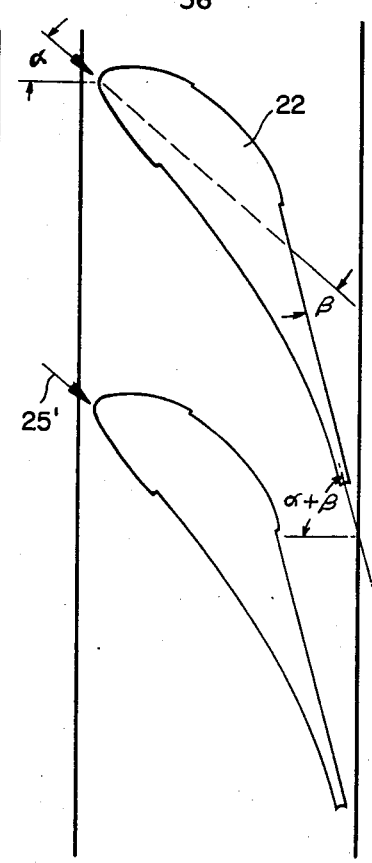

The angle of attack on the nozzle vanes 22 is now reduced from 72 degrees to 36 degrees and the leading edge shape can be substantially altered. Also, the pressure side surface can be flattened so that the steam from nozzle 2 can be more effectively administered to provide a more stable sub-layer laminar film. FIGS. 13a and 13b show, respectively, the prior art nozzle vane 23 and axial approach arrow 25 and nozzle vane 22 for the 36° approach indicated by arrow 25' as achieved by the present invention. The pressure side gas will accelerate more evenly from the stagnation point to the trailing edge which again helps retain and stabilize the laminar sub-layer for thermal shielding.

A comparison of the two vane shapes is shown in FIGS. 13a and 13b. Note the angle of attack, the changed nozzle vane leading edge shape and the flatter pressure side surface. It can be determined that the 36 degree angle of attack vane has a leading edge suction surface with some 25 percent reduced curvature. The 36 degree angle of attack vane also has only half the curvature radius of the 72 degree vane on the body pressure side. These substantial reductions in curvatures provide less aerodynamic drag and make possible surfaces which in turn encourage a stable laminar sub-layer for better film shielding.

The turning of the air and gas by the fuel nozzles and the skew tube arrangement is shown in FIGS. 11 and 12. Steam tubes 152 with their extended surface sheathing 156 are wrapped at a 36 degree angle with respect to the turbine frame. Individual coils 148 are hairpin shaped to form the inner and outer annular combustor surface and are set at the 36 degree angle. Combustor dome 150 is formed at the bend of the individual coils 148. The tubes 152 can be of an inside diameter of one-quarter to one-half inch. The low velocity cooling air will flow from the exterior of the annular liner 142 to the inside at the 36 degree angle where the velocity will be much higher and at a 2 to 2½ percent lower pressure.

Combustor dome 150 and the outer liner area contain openings 158 between the individual hairpin shaped coils 148. These openings 158 are necessary to allow the dual fuel nozzle 144 to be inserted inside the liner 142 and to provide an entrance for primary combustion air through swirler 145. On each outer and inner surface of annular combustor 142 are provided openings 160 near fuel nozzles 144 and between the individual hairpin shaped tubes 152 to allow additional air to enter the combustion zone for proper combustion and the desired fuel/air ratio for $NO_x$ control.

Primary combustion air flows to the inside of liner 142 by means of swirler 145 and turning vanes 146. Swirler 145 is configured to provide a spiral spinning action for the fuel and air, the swirler flow pattern arrows 149 and fuel flow pattern arrows 151 being shown in FIG. 12. Both the swirler flow pattern 149 and fuel flow pattern 151 are askew to the linear axis of the machine. Primary air passing through dome 150 is turned by vanes 146 to a flow path 153 also askew to the linear axis of the combustor liner.

Cooling combustion liners with compressor discharge air is becoming more difficult where higher compressor discharge temperatures are encountered at the higher compression ratios and where more air is needed to limit the primary flame temperature to help control $NO_x$ pollutants. The steam cooled liner of this invention makes available more air to control $NO_x$ because less air is needed to film cool the inside surfaces which are subjected to radiant heat from the primary flame. Thus, the spaces between coils 148 can be reduced since the coolant steam passed through the coils removes a substantial portion of the radiant heat.

The superior design of the annular combustor is well known and attempts have been made in the past to design an annular combustor that could be split in half so that an annular combustor liner could be used on a single shaft industrial gas turbine whereby it could be slipped over the shaft. To date no such arrangement has been successful due to the horizontal liner flange and the thermal distortion created.

Aircraft gas turbines use modular construction with splined shafting whereby the non-split annular combustor liner can be inserted with the shaft removed. Then the splined shaft can be inserted inside the annular combustor to mate the compressor shaft with the turbine shaft.

The proposed steam cooled combustor liner, with reference to FIG. 11, can be easily segmented into two, three, four or more parts. The individual segments can be slipped around a shaft and secured to the shell to form a single annular combustor. The combustor liner of FIG. 11 shows three segments 162, 164 and 166. The ends of tubes 152 forming the outer surface of annular combustor liner 142 are associated with the respective connector flanges 163, 165 and 167 for each segment, the individual flanges being connected at joint 168. Thermal expansion slits 169 between the bolt holes and the outer flange edge allow for differential growth. The connector flanges are bolted to the turbine bulkhead. An annular steam plenum 180 can feed or receive steam from tubes 152 forming the outer surface. The ends of tubes 152 forming inside combustor liner surface can be associated with a slip type joint commonly used in gas turbines.

Combustor liner inside surface exit extremity 170 is fitted with the male portion of the slip joint. As separate annular steam plenum 182 can be associated with tubes 152 forming the inner combustor liner surface.

Figure 11A:
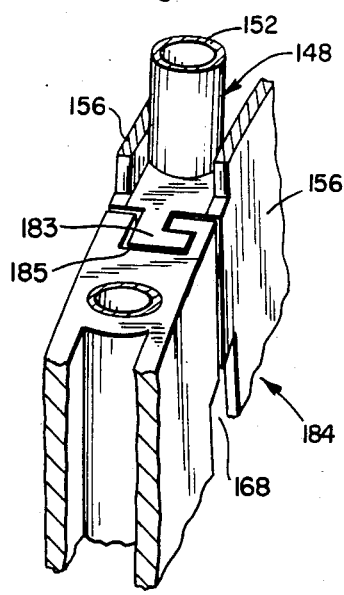
FIGS. 11 and 11A is a perspective cut-a-way view of the segmented annular combustor liner used to accomplish gas turning.

There is no horizontal joint to contend with as the joint or joints between segments 162, 164 and 166 run at a 36 degree spiral where the individual hairpin tubes 152 join each other with reference being made to FIG. 11a. Positioning clips 184 can be used whereby each segment will slip adjacent to the adjoining segment before being bolted to the turbine bulkhead. Male L-shaped extension 183 from one combustor liner segment or grouping of tubes 148 slip into female L-shaped opening 185 of the adjacent combustor liner segment at segment joint 168 to position and lock the adjacent segments together. No welding or bolting of the segments is necessary. The individual segments can be screwed into the positioning or locking clips. Clips at the dome area, midspan and the bulkhead are all that are necessary.

With reference to FIG. 12, it can be seen that the flame travel distance from fuel nozzle 144 to the first stage nozzle 18 will be longer with the cocked fuel nozzle, inlet turning vanes and the skew steam cooling coils. The flame travel or length will be about 24 percent longer for a 36 degree turning angle where the hypotenuse of the vector triangle formed is equal to the reciprocal of the cosine of 36 degrees with the axial flow length being equal to the cosine of 36 degrees. The added 24 percent longer travel will make it possible to reduce the length of the combustor about 15 percent, and still have added protection against flame impingement on the first stage vanes, a distinct advantage up and beyond film cooling advantages already mentioned.

Vane Exit Mach Velocity

As previously explained, a shock wave is produced by a disturbance very near the surface in the region where laminar (viscous) flow stops and extreme shearing, tearing or ripping takes place. Strong sound waves are generated in this region and the relative velocity between the fluid and the surface is such that the waves cannot escape. A barrier develops and causes a pressure gradient or shock wave.

Figure 14:
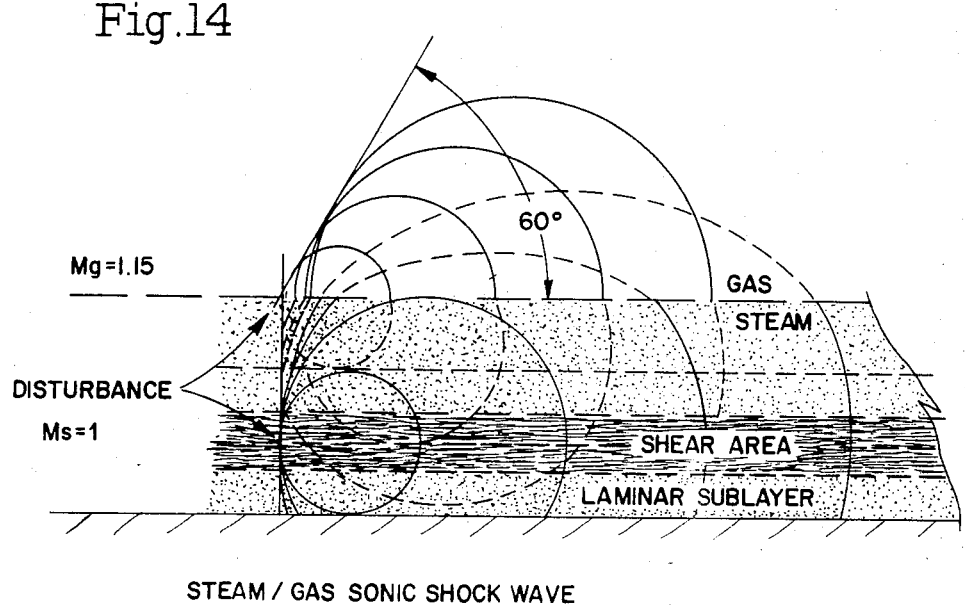
FIG. 14 is a profile of a sonic shock wave emanating from the shear disturbance in the coolant steam boundary layer.

Reference is made to FIG. 14 which shows schematically what can be expected to take place in a binary flow system where steam flows next to the surface and where diffusion and mixing has not occurred. In actuality diffusion and mixing does occur and there is no clearcut distinction between the steam and gas, but for analysis sake, this gradual change from steam to gas is ignored. The disturbance (tearing action that generates the sound) takes place within the steam layer and at steam Mach 1 the shock wave starts to develop. As can be noted by the bottom sound wave circles, a ninety degree shock is created such as exists at the throat of any convergent/divergent nozzle. There is no loss in pressure or entropy and no change in temperature at Mach 1 as is well established. The sound wave in steam travels about 22 percent faster than in gas and, therefore, as can be noted, the circles flatten out as the waves pass through the gas.

A secondary weaker disturbance can develop where the steam and gas meet when theoretically no mixing or diffusion has taken place. The secondary disturbance will then set up a mild shock wave, the angle of which is dependent upon the gas Mach number. In FIG. 14 a gas Mach number of 1.15 is calculated to produce a sixty degree shock wave. Note that the sound wave circles travel some 22 percent slower in the gas and are thus smaller in diameter. Also the sound wave circles bulge out, as can be seen from the dashed projections, when they strike the layer of steam. This mnemonic diagram helps explain the binary flow system and its shock wave (choking) condition which is different in nature than a shock wave for a monoral flow system.

The nozzle inner and outer side walls 56 and 58 do not present a shock wave problem as their surfaces are smooth and can be shaped to act as any convergent/divergent nozzle where the velocity will increase through Mach 1 without a shock wave and without a loss in entropy.

A further point to consider is that the gas stream exiting at over Mach 1 will be diverging due to its change in specific volume relative to its velocity whereas the steam layer at Mach less than one will be converging due to its volume/velocity relationship. Therefore, the total binary flow will accelerate at nearly constant cross-sectional area which is consistent with there being no physical change in actual area downstream of the vanes.

If the steam layer is at 1800° F. and at Mach 1, and if the gas stream is at 2200° F., the nozzle exit temperature, then the gas stream can have a velocity of some 2750 ft/sec. with an equivalent Mach number of 1.15. Yet, the main gas stream is independent of the steam layer flow in terms of Mach number velocity and only reacts to the sound waves that originate from the primary disturbance or the weaker secondary disturbance.

The binary flow shock wave phenomenon then leads to the possibility of being able to reach an equivalent Mach 1.15 velocity before full choking sets in by the steam layer and its shock wave. This being the case, a 15 percent higher exit velocity can be achieved without a high trailing edge shock loss occurring. It is important to note that the gas temperature striking the rotating blades will be 100° F. lower because of the greater expansion and lower exit pressure. The turbine rotating blade design and rotating speed can be adjusted upward to accept this higher velocity and to take advantage of the lower gas temperature. A higher work load for this first stage can be achieved without resorting to a transonic reaction rotating blade design and higher transonic friction and shock wave losses.

Figure 15:
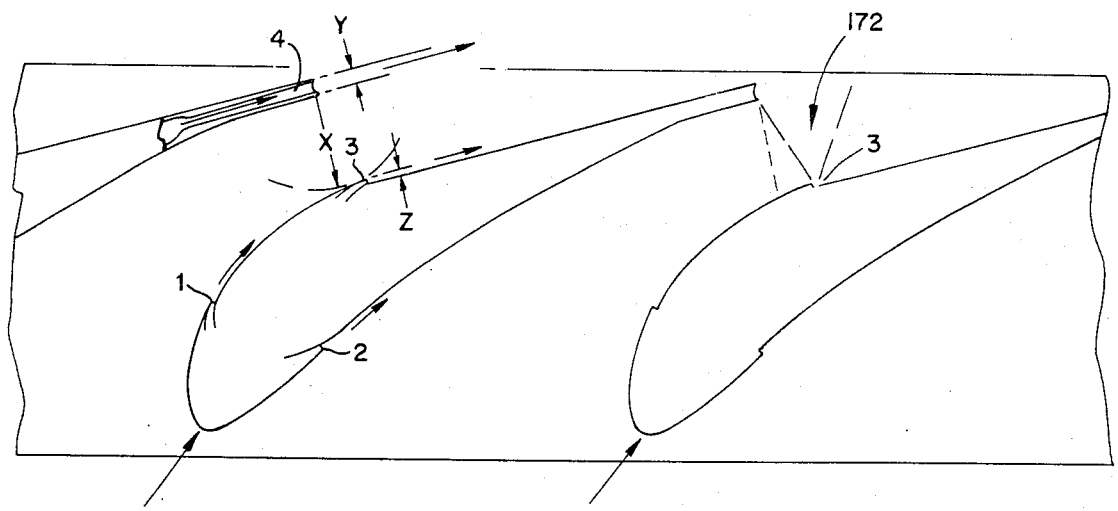
FIG. 15 is a profile showing the throat width and trailing edge shock wave at the throat of the integrated gas/steam nozzle.

Reference is now made to FIG. 15 which shows the normal steam Mach 1 throat shock wave 172 in a binary flow system. Steam from the leading edge weep holes and nozzle number 1 supplies the blanket of steam over the suction side surface to nozzle 3. Here a trailing edge disturbance takes place which causes the shock wave to establish itself between the vane trailing edge 34 and nozzle 3 of adjacent vanes as shown. This shock wave is just upstream of the Mach 1 nozzle 3 steam exit (800° F. and 2100 ft/sec.). The gas, after leaving the trailing edge, diverges slightly to help fill the trailing edge void and to accelerate to Mach 1.15 as it flows from nozzle 3 to the suction side trailing edge. The velocity on the pressure side is subsonic all the way from the leading edge to the trailing edge and only attains Mach 1 at the trailing edge where the shock wave takes place. The gas, after leaving the vane, can accelerate to Mach 1.2 through divergence made possible by the thicker than normal trailing edge. Finally, the binary flow system of steam and gas offers a way to achieve Mach 1.15 to 1.20 equivalent main stream velocity without excessive shock wave losses due to the fact that steam has some 22 percent greater sonic velocity for a given temperature than the gas.

Referring further to FIG. 15, there is shown the integrated exit nozzle width. The individual steam nozzles 1, 2, 3 and 4 are shown discharging to the main gas stream. The critical Mach 1 throat width can be seen to be the arithmetic sum of the three components X, Y and Z. Distance X is shown as the distance from the extreme pressure side vane trailing edge to the point immediately upstream of steam nozzle 3. Distance Y is shown as the width of steam nozzle 4 exit. Distance Z is shown as the width of steam nozzle 3 exit. The total nozzle area can be determined by integrating the total X, Y and Z distances between the individual vanes for the 360 degree annulus with the inner and outer diameters of the annulus.

While several embodiments of the nozzle vane assembly and combustor assembly of this invention have been depicted and described, it will be appreciated by those skilled in the art that many variations and modifications may be made hereto without departing from the fundamental theme of the invention.

What is claimed is:

1. An annular combustor liner for forming a combustion gas comprising; means to direct compressed air into the annular space of said combustor liner, means to direct a combustible fuel and mix with said compressed air in the annular space of said combustor liner, means to ignite said combustible fuel with said compressed air and form a combustion gas, said annular combustor liner being formed by a plurality of U-shaped elements placed adjacent to each other, the bend of said U-shaped elements forming the dome of the combustor liner and the respective legs of said elements forming the inner and outer surfaces of said combustor liner and confining said annular space, said elements being placed askew to the linear axis of said combustor liner.

2. The combustor liner of claim 1 including gas turning vanes located at the dome of said combustor liner.

3. The combustor liner of claim 1 including means to direct said fuel into said combustor liner in a direction askew to the linear axis of said combustor liner.

4. The combustor liner of claim 1 wherein said combustor liner comprises a plurality of independent sections placed adjacent to each other, each section containing a plurality of said adjacent U-shaped elements.

5. The combustor liner of claim 1 wherein said elements are hollow tubes.

6. The combustor liner of claim 5 wherein said hollow tubes are cladded with an exterior sheathing to control air flow into the annular combustion region.

7. The combustor liner of claim 1 including a first group of plural spaced openings in the inner and outer surfaces of said annular combustor between said U-shaped elements at a location near said fuel mixing means to provide the desired amount of air for controlling combustion within the combustion zone.

8. The combustor liner of claim 7 including a second set of plural spaced openings in the inner and outer surfaces of said annular combustor liner between said individual spaced elements in a location downstream of said first group of openings.

9. The combustor liner of claim 6 including gas turning vanes in the dome of said combustor liner.

10. The combustor liner of claim 9 wherein said gas turning vanes are formed by said sheathing.

11. The combustor liner of claim 10 wherein said fuel mixing means is directed in said annular space in a flow path askew of said linear axis of said combustor liner.

12. The combustor liner of claim 1 wherein the ends of said U-shaped elements forming said outer combustor liner surface are associated with a combustor flange, said flange being bolted to the bulkhead to secure said combustor liner.

13. The combustor liner of claim 5 comprising a source of steam and means to direct said steam into the interior of said tubes.

14. The combustor liner of claim 4 wherein said independent sections are joined together by matching male and female connector bracket means.

15. The combustor liner of claim 4 comprising three of said independent sections.

16. The combustor liner of claim 1 including in the dome area a first set of fuel nozzles and an opening for primary combustion air thereto.

17. The combustor liner of claim 16 including at a location downstream of said dome area a second set of fuel nozzles and an opening for primary combustion air thereto.

18. The combustor liner of claim 6 including a source of steam and means to direct steam into the interior of said tubes and wherein said sheathing is provided with extended surface area to transfer radiant heat to the steam passing through the tubes and to provide a means of film cooling the inside surface of the combustor liner.

19. The combustor liner of claim 4 wherein said independent sections are assembled around a rotatable shaft.

20. The combustor liner of claim 18 including a narrow space between the sheathing of adjacent tubes to control the amount of cooling air entering the interior of the combustor.

21. The combustor liner of claim 13 including means to direct said steam in the interior of said tubes from said combustor liner.

* * * * *